United States Patent [19]
Campbell et al.

[11] 3,906,019
[45] Sept. 16, 1975

[54] PREPARATION OF DI(ISOCYANATO-TOLYL) UREA

[75] Inventors: Gregory A. Campbell, Romeo; Thomas J. Dearlove, Troy; William C. Meluch, Birmingham, all of Mich.

[73] Assignee: General Motors Corporation, Detroit, Mich.

[22] Filed: Apr. 25, 1974

[21] Appl. No.: 463,991

[52] U.S. Cl. .................. 260/453 P; 260/453 AR
[51] Int. Cl.² ............. C07C 118/00; C07C 119/048
[58] Field of Search .... 260/453 AR, 453 P, 453 AB

[56] References Cited
UNITED STATES PATENTS
2,757,184   7/1956   Pelley ............................ 260/453

Primary Examiner—Lewis Gotts
Assistant Examiner—Dolph H. Torrence
Attorney, Agent, or Firm—George A. Grove

[57] ABSTRACT

Water and toluene diisocyanate (TDI) are rapidly and thoroughly mixed to produce a di(isocyanato-tolyl) urea monomer which is used in the preparation of polyurethane resins. A sufficient excess of either reactant, with respect to stoichiometry, is required to provide a suspension medium having a relatively low viscosity; this allows the continued vigorous stirring of the reactants and the product. The expected polymerization reaction which would form undesirable higher molecular weight ureas is prevented by the extreme immiscibility of the monomeric urea in either water or toluene diisocyanate (TDI). The desired monomer precipitates and is the final product of this reaction.

3 Claims, No Drawings

PREPARATION OF DI(ISOCYANATO-TOLYL) UREA

BACKGROUND OF THE INVENTION

This invention relates to a simplified method of preparing urea monomers which are used in the production of isocyanate terminated urethane prepolymers. This preparation is accomplished by mixing water and toluene diisocyanate (hereinafter TDI) with either reactant in excess of the stoichiometrically required proportion and recovering and drying the desired crystalline urea monomer.

The prior art teaches that the direct addition of water to TDI or vice versa will unavoidably produce a polymeric urea. This teaching is consistent with the knowledge that the isocyanate functionality will readily react with water and that urethane prepolymers are often cured with atmospheric moisture. On the basis of this teaching, it was believed that the interfacial polymerization reaction could not be controlled to produce a monomeric product which was substantially free of higher molecular weight ureas.

Examples of the prior art are U.S. Pat. Nos. 2,757,184 and 2,757,185 assigned to du Pont. They disclose processes employing a solvent and requiring prolonged reaction times wherein the two components, water and TDI, are dissolved in an oxygen-containing solvent which is free from active hydrogen groups and which is selected from the class consisting of esters, ethers and ketones. The reactants are slowly blended at, or near, stoichiometric proportions and the reaction temperature is maintained between 0° and 30° C. The '184 patent specifically cautions that it is necessary to add the water slowly to prevent the formation of a polymeric urea. The temperature must also be maintained within the designated range, to prevent the formation of an inferior urea which is contaminated with higher molecular weight ureas.

Furthermore, these patents warn that care must be given in selecting the proper solvent so as to choose one that will not act as a polymerization catalyst and the patents go to great lengths to describe the properties of such a solvent. Finally, the processes, as disclosed in these patents, require the use of nearly stoichiometric proportions to produce the monomeric urea; it is alleged that if an excess of isocyanate groups are used there will be unreacted isocyanates in the product which must be removed, and on the other hand if an excess of water is used the product will be a polymeric urea.

A direct consequence of this typical prior art approach is the relatively long reaction times and the high costs associated with solvents, metering devices and, in general, a complicated reaction process.

OBJECTS OF THE INVENTION

It is an object of this invention to provide a simplified process for the production of di(isocyanato-tolyl) ureas.

It is a further object of this invention to provide a process for the production of a di(isocyanato-tolyl) urea wherein water and TDI are directly and rapidly mixed and reacted without an extraneous solvent and without forming significant amounts of polymeric by-products.

SUMMARY OF THE INVENTION

These and other objects and advantages may be accomplished in accordance with our invention by thoroughly mixing water and TDI to form and to precipitate the subject monomeric urea and then washing and drying the product. The rapid precipitation of the desired urea effectively stops further polymerization.

This reaction may be carried out at room temperature and pressure; and it is preferred that cooling means be used to prevent excessive heating by the reaction's exotherm. This is desirable because as the reaction temperature increases, the urea monomer becomes more soluble in both TDI and the water, and the possibility of continued polymerization reactions, which yield higher molecular weight ureas, is thereby increased. However, if the reaction temperature is maintained in the range of 30° to 40° C., the reaction product will be sufficiently pure to be useful for purposes such as the preparation of urethane prepolymers.

A suitable preparation of the urea monomer may employ an excess of either the water or TDI, and the reaction may be carried out with or without a catalyst, which would be any Lewis acid or any Lewis base such as pyridine, dibutyl tin dilaurate, or dibutyl tin distearate. In addition, both the 2-4 and 2-6 isomers of toluene diisocyanate may be used, either alone or in solution with each other. However, if such a solution is used, the 2-4 isomer will be consumed first because it is the more reactive isomer.

The following isomers of the basic di(isocyanato-tolyl) urea will be produced. The reaction of 2-4 TDI and water will produce 1,3-bis(3-isocyanato-p-tolyl) urea, which has the structural formula:

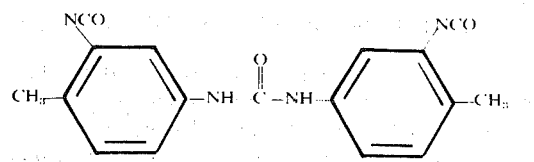

The reaction of 2-6 TDI and water will form 1,3-bis(3-isocyanato-o-tolyl) urea which has the structural formula:

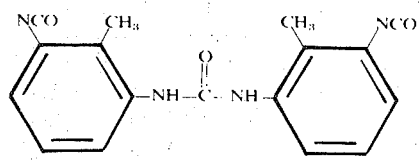

In addition to the two aforementioned symmetrical urea isomers, a nonsymmetrical urea isomer will be produced if a mixture of 2-4 and 2-6 TDI is reacted with water. This isomer is 1-(3-isocyanato-p-tolyl), 3-(3-isocyanato-o-tolyl) urea and it has the structural formula:

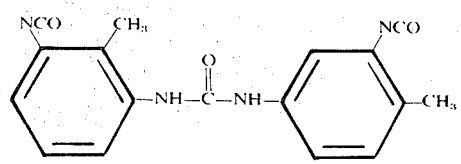

In accordance with the preferred embodiment of our invention, 30 parts of TDI, 10 parts of water and 0.7 parts of pyridine are combined and stirred vigorously, and the temperature of the reaction is controlled within a range of 30° to 40° C. The product urea forms as a white precipitate and byproduct carbon dioxide is evolved. Within a 15 to 30 minute time period the reaction has reached its end point as indicated by the cessation of the evolving gas. This gas, carbon dioxide, is the expected byproduct of this particular polymerization reaction. Once the reaction is complete, the reaction vessel contains a white solid precipitate and water. The water is decanted and the precipitate is then slurried with hexane or ethyl acetate and filtered to purify the product. The yield of this preferred method is about 60%.

The preferred embodiment of this invention calls for a considerable excess of water. This provides an improved heat transfer medium and a suspension medium for the urea. By suspending the urea product it is possible to easily maintain the vigorous stirring which is necessary to achieve the desired reaction rates. Without adequate mixing, the reaction rate slows considerably because of the reduced contact between the water and the TDI. An excess of TDI may also serve as the suspending medium, however, higher yields and reaction rates are achieved with an excess of water.

The main advantage of this method of preparation is markedly reduced reaction time and ease of separation of the urea product. This translates into a reduced production cost. In the cited reference the reaction times for this subject reaction varied from 4 to 18 hours. By the use of the subject method the reaction time is reduced to a range of from 15 to 30 minutes.

DETAILED DESCRIPTION OF THE INVENTION

The following examples are presented to demonstrate that a relatively pure urea monomer may be obtained by simply mixing water and TDI with or without a catalyst and to illustrate the preferred embodiment.

EXAMPLE 1

To an open beaker fitted with a stirrer, 1,300 grams of 2-4 TDI, 200 grams of water and 7 milliliters of pyridine were added; the temperature was maintained between 30° and 40° C. by the addition of about 200 grams of ice. The evolution of carbon dioxide ($CO_2$) indicated that the reaction was in progress. The reacting mixture was vigorously stirred and the liquid clouded as the desired urea precipitated from the solution. After about 30 minutes the remaining liquid was decanted. The white solid was then slurried with hexane, filtered, reslurried with hexane and vacuum dried. The yield was 1,000 grams of a urea monomer.

The product of this reaction was characterized and identified as the desired urea by infrared spectroscopy. The characteristic isocyanate band was evident at 4.4 microns. A subsequent reaction with methanol caused this isocyanate band to disappear and cause the appearance of a carbonyl band at 5.9 microns. This reaction is characteristic of the desired urea monomer. Gel permeation chromatography showed that the molecular weight of the product was about 350 as compared to the theoretical 322. This indicates a slight contamination by a higher molecular weight urea, but this is well within the acceptable range for the production of an isocyanate-terminated prepolymer. The melting point of the product occurred within the range of 170° to 180° C. This particular example demonstrates a preferred embodiment which is selected on the basis of the maximum yield.

EXAMPLE 2

This example demonstrates that the subject preparation method may employ a large excess of TDI. 2 grams of water were added to a well stirred reaction vessel containing 174 grams of 2-4 TDI. After stirring for several hours an additional gram of water was added. The resulting mixture was stirred for an additional 24 hours and then 200 milliliters of hexane were added and the white solid product was filtered and then washed twice more with hexane to yield a total of 35 grams of urea monomer. The melting point of this product fell within the range of 178° to 180° C. Because of the relatively long reaction time and low yield of this example it is not a preferred embodiment. However, it does demonstrate that a monomeric urea can be produced from the simple addition of water to toluene diisocyanate and that a high molecular weight urea is not produced as the prior art would lead one to believe.

While our invention has been described in terms of certain specific embodiments, it will be appreciated that other forms thereof could readily be adapted by one skilled in the art. Therefore, the scope of our invention is not to be limited to the specific embodiment disclosed.

We claim:

1. A method of preparing a di(isocyanato-tolyl) urea in substantially monomeric form comprising:
    rapidly and thoroughly mixing liquid water and toluene diisocyanate in a reaction vessel at a temperature in the range of from room temperature to about 40° C. to form said urea, with said water and said diisocyanate being immiscible and forming two liquid phases in said mixture from which said urea separates as a solid product as it is formed, there being a stoichiometric excess of either said water or said diisocyanate which serves as a suspension medium for the other liquid reactant and the solid product, and
    separating said urea from said medium.

2. A method of preparing a di(isocyanato-tolyl) area in substantially monomeric form comprising:
    a. rapidly and thoroughly mixing and reacting from 20 to 40 parts by weight toluene diisocyanate and from 5 to 15 parts by weight of liquid water in a reaction vessel at a temperature in the range of from about 30° C. to about 40° C. wherein the unreacted constituents serve as the suspension medium for said reaction, and said urea precipitating from said medium as it is formed, and
    b. separating said urea from said medium.

3. A method of preparing a di(isocyanato-tolyl) area in substantially monomeric form comprising:
    a. rapidly and thoroughly mixing and reacting from 20 to 40 parts by weight toluene diisocyanate and from 5 to 15 parts by weight of liquid water and from 0.5 to 1.0 part by weight of a catalyst, said catalyst being either a Lewis base or a Lewis acid, in a reactional vessel, at a temperature in the range of from room temperature to about 40° C. wherein the unreacted constituents serve as the suspension medium for said reaction, and said urea precipitating from said medium as it is formed, and
    b. separating said urea from said medium.

* * * * *